Sept. 29, 1959 O. E. ROTHFUCHS ET AL 2,906,012
JOURNAL BEARING PRESS
Filed June 15, 1954 6 Sheets-Sheet 1
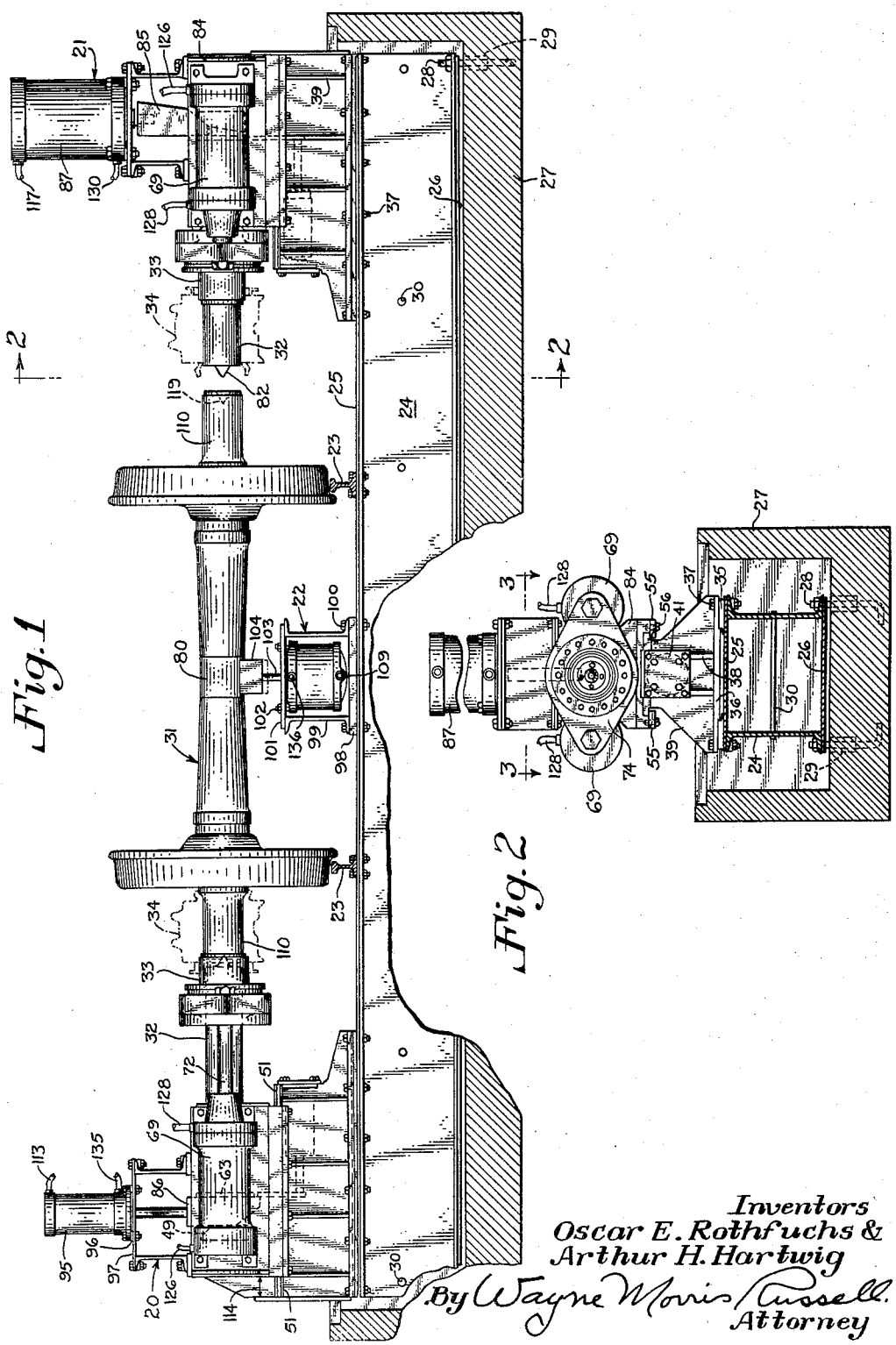
Inventors
Oscar E. Rothfuchs &
Arthur H. Hartwig
By Wayne Morris Russell
Attorney

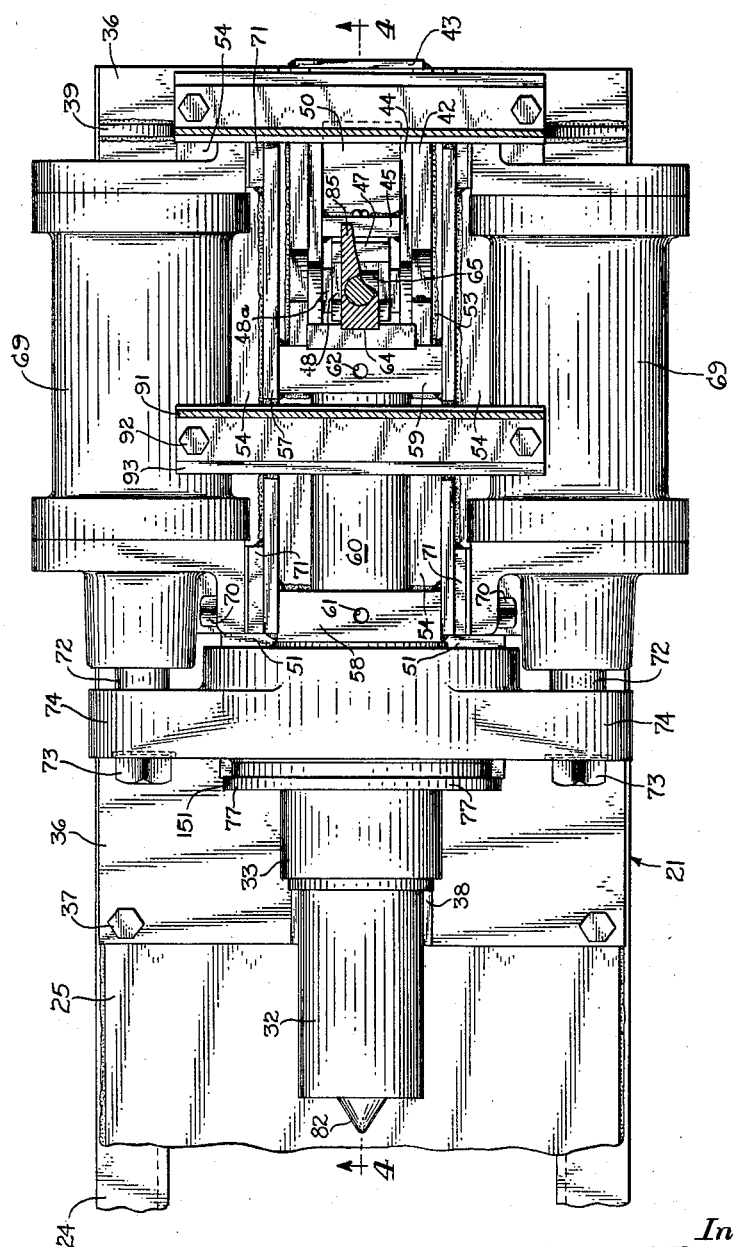

Sept. 29, 1959 O. E. ROTHFUCHS ET AL 2,906,012
JOURNAL BEARING PRESS
Filed June 15, 1954 6 Sheets-Sheet 4

Inventors
Oscar E. Rothfuchs
& Arthur H. Hartwig
By Wayne Morris Russell.
Attorney

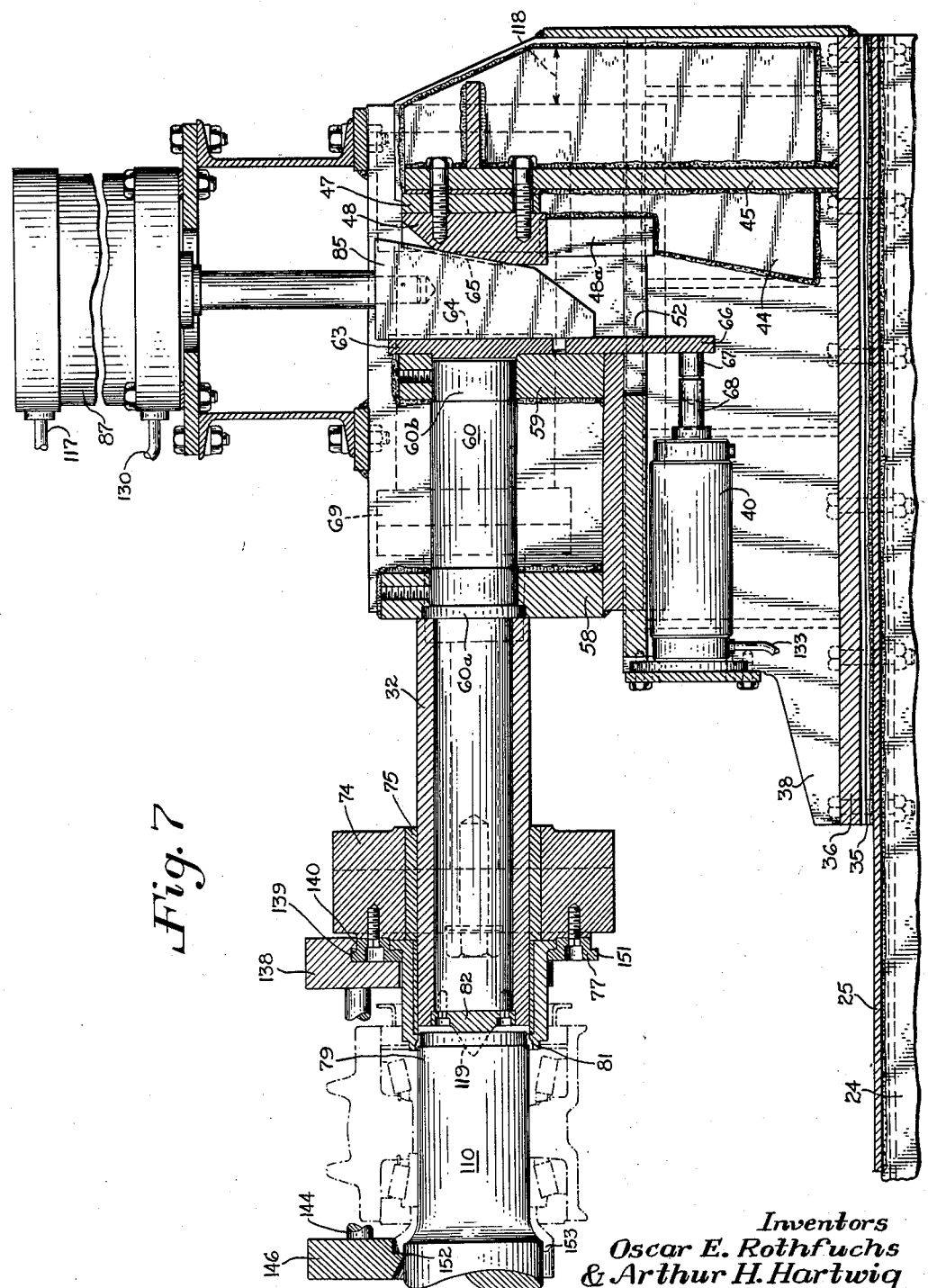

Sept. 29, 1959   O. E. ROTHFUCHS ET AL   2,906,012
JOURNAL BEARING PRESS
Filed June 15, 1954   6 Sheets-Sheet 6

Inventor
Oscar E. Rothfuchs
& Arthur H. Hartwig
By Wayne Morris Russell.
Attorney United States Patent Office 2,906,012
Patented Sept. 29, 1959

2,906,012

JOURNAL BEARING PRESS

Oscar E. Rothfuchs and Arthur H. Hartwig, Michigan City, Ind., assignors to Pullman Incorporated, a corporation of Delaware Application June 15, 1954, Serial No. 436,966

2 Claims. (Cl. 29—252)

This invention relates to a press and more particularly to a press for pressing bearings on railway wheel and axle unit journals.

Bearing presses now in use require the manual attachment of a pilot and a sleeve to the end of an axle before the bearing can be pressed on the axle journal, after which the sleeve and pilot must be removed, thus adding to the time delay and cost of assembly. Other presses use a manual shimming under the wheels to align the axle center with the press centering cones, the shimming being necessary due to the dimensional tolerances had in manufacture of such railway wheels again causing time delay and high cost. Some presses are capable of handling only one size of the four A.A.R. axle journals.

To overcome and eliminate such difficulties by the use of efficient mass production apparatus, this invention was conceived.

It is to be emphasized that due to the extreme importance of the efficiency of the journal bearings, the method and apparatus used in assembly must be quite precise, yet capable of handling units weighing as much as 3,000 pounds.

It is therefore the principal object of this invention to provide a press for pressing bearings on any standard sized railway wheel and axle unit journal without the need for additional guiding devices on the axles.

Another object of this invention is to provide a press capable of changing from one size axle journal to another with a minimum of parts interchange and time lag.

Another object of this invention is to provide a press capable of suspending in air a railway wheel and axle unit in order to obtain perfect centering between the axle and the press bearing sleeve.

Yet another object of this invention is to provide a press capable of sequentially lining up the journal and the press bearing sleeve and then pressing on the bearing without appreciably moving the wheel and axle unit.

A further object of this invention is to provide a press having means for locking the axle and the bearing sleeve in positive relationship.

A further object of this invention is to provide a press apparatus sequentially operable to press a bearing from the press onto the axle journal by a control system adaptable to be completely automatic.

Yet a further object of this invention is to provide a press capable, by the addition of a specially designed bearing puller, not only of the simultaneous pressing of a bearing on each axle journal, but also the simultaneous removal of both bearings.

These and other objects will become more apparent from the following descriptions and accompanying illustrations, wherein:

Fig. 1 is a side elevational view of an embodiment of the invention showing the center unit lift in actuated position, the right half of the press in non-operating position, and the left half of the press in full operating position;

Fig. 2 is a front elevational view of the right half of the press looking on the line 2—2 of Fig. 1;

Fig. 3 is a horizontal sectional view of the right half of the press taken along the line 3—3 of Fig. 2, showing in plan the major portion of the right half of the press;

Fig. 7 is a vertical sectional view of the right half of the press as in Fig. 4, showing it at the completion of its operation and with a bearing puller mounted for subsequent removal of the bearing upon return of the right half to a non-operating position;

Figure 4:
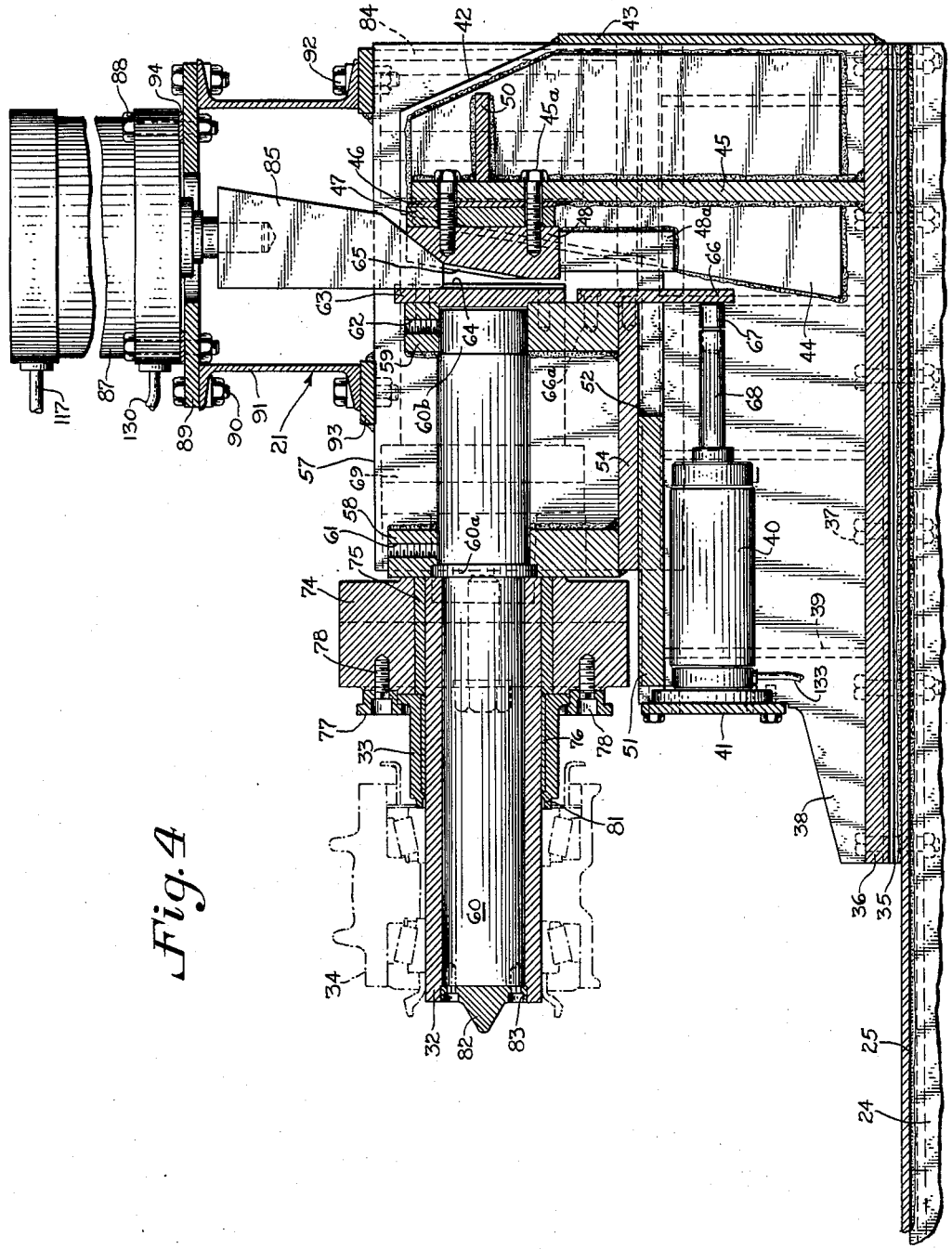
Fig. 4 is a vertical sectional view of the right half of the press taken along the line 4—4 of Fig. 3, showing the right half in non-operating position.

Referring now to Fig. 1, the press is shown as comprising a left half 20, a right half 21 spaced from said left half, and a center lift 22. The two halves, the lift, and a pair of rails 23 are all mounted on a concrete enclosed foundation consisting of a pair of spaced channel beams 24 secured at the top and bottom to support plates 25 and 26, the base of the beams 24 being connected through the bottom plate 26 to the concrete 27 by bolts 28 and spacers 29. Spacer bars 30 give added support to the channel beams 24. A wheel and axle unit 31 is shown in axle-supported position above the rails 23 and directly between the press halves, the center lift 22 having raised the unit from a wheel-supported position on the rails. As will be explained in more detail hereinafter, the bearing-carrying sleeve 32 and the bearing pusher collar 33 of the right half 21 are both shown in their non-operating position, whereas the identical parts 32 and 33 on the left half 20 are shown in their complete centering and pressing or axle engaging positions respectively, the bearings 34 being shown in phantom. As both press halves 20 and 21 are identical, with certain limited exceptions, the remainder of the structural description will refer specifically to the right half 21, the exceptions being noted.

At the end of the foundation beam unit 24 and mounted on top of the top plate 25 are a pair of flat support bars 35 which form a pocket for the base assembly. The asssembly comprises a base 36 which fits into the support bars pocket and which is secured, as by bolts 37, through the bars 35 and the plate 25 to the top of the beams 24. A pair of side plates 38 are mounted near the center of the base 36 and extend completely to the rear of the base, being supported at spaced intervals by web plates 39 also mounted on the base. The side plates form a receptacle for a piston and cylinder unit 40 (Fig. 4), the function of which will be explained hereinafter, which is secured to the side plates by a cover plate 41. Adjacent their rear ends, the side plates 38 have integral upstanding portions 42 to which a backing plate 43 is secured as by welding. Further lateral support is given to the side plates 38 by a pair of plates 44 welded to the inner faces thereof, the upper parts of which have a similar outline to that of the side plates (Fig. 4). A vertically disposed backstop 45 is secured, as by welding, between the plates 44, and serves as a support for holding a shim 46, a wedge shim 47, and a rear wedge guide 48, these parts being held together by bolts 45a. Added support is given the rear wedge guide 48 by a pair of supports 48a, each of which is secured as by welding, to the inside of each plate 44. The supports are notched to form a pocket in which guide 48 may securely seat. The shim 46 is provided to assure that the back of the wedge guide 48 will be perfectly vertical (Fig. 4). Referring to Fig. 1, it may be noted that the press left half 20 has a straight rear wedge guide 49 as compared to the angular right half wedge guide 48. A horizontal brace 50 for the backstop 45 is secured thereto and to the inner sides of the plates 44. Secured on top of the forward portions of the side plates 38 is a flat top plate or slide track 51 the side portions of which are reduced and project laterally outwardly of the side plates. A central slot 52 (Fig. 4) extends from the rear end of the plate 51 to accommodate the upstanding side plate portions 42, which are secured to the edges of the slot as by welds 53 (Fig. 3), the slot extending forwardly of the side plate portions 42 to approximately the center of plate 51 and having its forward portion preferably narrower than the rear portion adjacent the upstanding portions 42.

A longitudinally movable shaft assembly is mounted on the base assembly for longitudinal sliding movement thereon. The shaft assembly comprises a sliding base 54 which is longitudinally undercut so as to contact the top and sides of the base assembly slide track 51. A pair of keepers 55 (Fig. 2) are secured as by bolts 56, one spaced under each side of the base 54 so as to underlie the side edges of the slide track 51 and form grooves therefor. A pair of vertical side supports 57 (Fig. 3) extending the entire length of the base 54 are mounted thereon, being secured as by welding thereto, and are braced at their forward ends by a transverse front support 58 and at their center by a center support 59, both supports having secured therein the centering shaft 60. The centering shaft 60 has a collar 60a, slightly off-center and toward the rear of the shaft, which seats in a cut-out therefor in the front support 58 when the shaft is in its most rearward position, and also has a portion 60b at its rear with a slightly smaller diameter than the portion intermediate it and the collar 60a, the portion 60b seating in the rear support 59 in the rearward position. It is also to be noted that the shaft bearing sleeve 32 extends from the collar 60a to slightly beyond the front of the shaft, as will be explained hereinafter. Threaded openings 61 and 62 may be provided in both front and center supports, respectively, for further securing of the shaft 60 by set screws or the like if desirable. A front wedge guide 63, having a guide slot 64 directly opposite a guide slot 65 in the rear wedge guide 48, is secured to the center support 59 directly behind the shaft 60. A return plate 66 is secured to the center support as by bolts 66a and depends therefrom for contact with a stud 67 which is attached to the piston rod 68 of the return cylinder 40.

A pair of piston and cylinder units 69 are mounted in the horizontal plane of shaft 60 one on each outer side of the side supports 57 (Fig. 3), being secured, as by bolts 70, to mounting pads 71 which are attached to the outer front and rear sides of each side support 57. It is important that the longitudinal axes of the cylinders be parallel with that of the centering shaft 60 for proper operation. The piston rods 72 of the units 69 are secured by bolts 73 to a common cylinder head 74 which reciprocates on the centering shaft bearing sleeve 32, a bushing 75 being fixed to the internal bore of the head 74. The bearing pusher 33 is of generally cylindrical hollow form fitting on the sleeve 32 and is provided with a bushing 76. The pusher is connected to the forward face of the cylinder head by a clamping ring 77 which is secured directly to the head 74, as by bolts 78. To allow for a slight shoulder 79 on the axle 80, the forward end of the bore of the pusher is formed with a slight taper or undercut 81. A centering cone 82 is secured to the front of the shaft 60 and has a shoulder 83 protruding into the bore of the bearing sleeve 32 to prevent any tendency of the sleeve to be pushed off the shaft 60. Additional support is given to the rear of the side support 57 by a pair of transversely extending web plates 84.

For the purpose of actuating the centering shaft 60 and associated parts, an angular wedge 85 is mounted for vertical reciprocation between the front and rear guides 63 and 48 (Fig. 4). The wedge 86 for the left half 20 of the press is a straight wedge as compared to the right half angular wedge 85 (Fig. 1). The wedge 85 is operated by a vertically disposed piston and cylinder unit 87 mounted thereabove and which is attached by bolts 88 to a mounting plate 89. The plate 89 is secured, as by bolts 90, to a pair of transversely arranged channel supports 91 which are secured, as by bolts 92, to a pair of mounting bars 93 secured to the top of the shaft assembly side supports 57 adjacent the rear thereof (Fig. 4). Shims 94 are provided between the cylinder unit 87 and the mounting plate 89 enabling adjustment of the wedge stroke. Due to the slightly different requirements of the left half wedge 86, a smaller piston and cylinder unit 95 is provided, allowing for shims 96 and mounting plate 97 which are comparable to the right half shims 94 and plate 89.

The center lift piston and cylinder unit 22 is mounted in vertical position on a bottom plate 98 which is secured to the foundation support plate 25. A pair of channel members 99 are secured to the plate 98 and support plate 25, as by bolts 100. A top plate 101 is attached to the top of the members 99 and is further attached, as by bolts 102 to the unit 22. The unit piston rod 103 has secured at its upper end a lift block 104 which is grooved at the top to receive the center of the axle 80.

Figure 5:
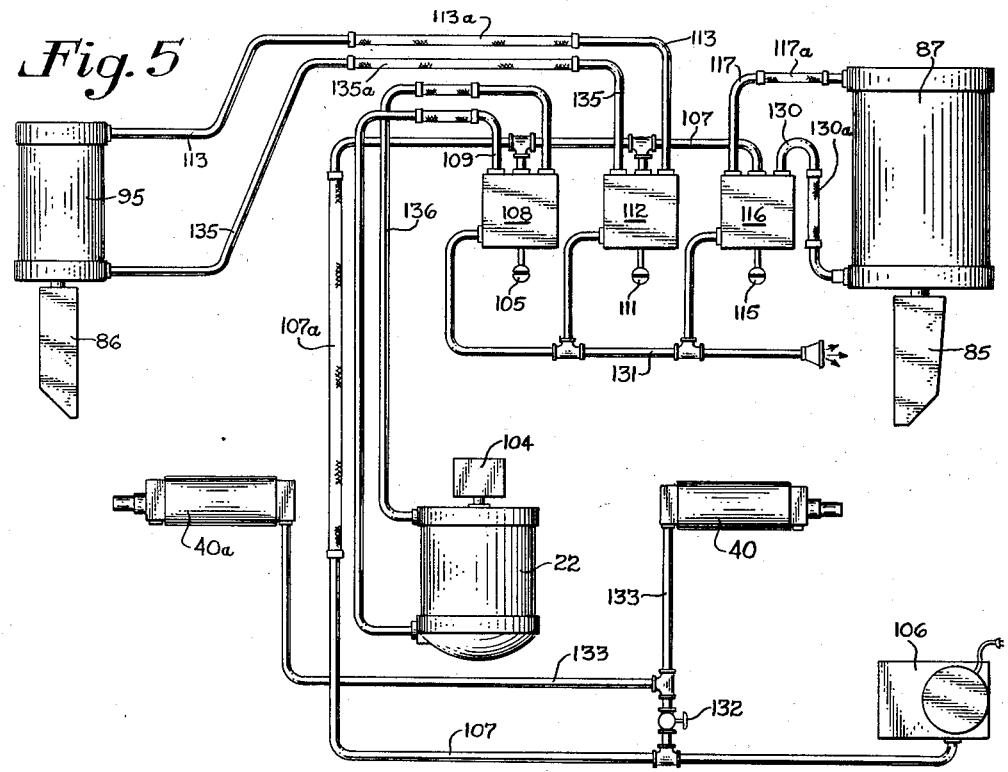
Fig. 5 is a diagrammatic view of the fluid control system for operation of the press center sleeves.

It being obvious that various control systems could be devised for the operation of the press, from fully automatic to any degree of partially automatic control, one particular system has been disclosed here for complete operational disclosure. Referring now to Fig. 5, in which a schematic piping diagram of a fluid air circuit is depicted, whereas in Fig. 6 a diagram of a fluid oil circuit for the right half 21 of the press is schematically illustrated, a complete operational description of the press will be related. Both left and right halves 20 and 21 of the press are initially in return or non-operating position (Fig. 4). An axle journal bearing 34 is slipped on each centering shaft sleeve 32. Then a wheel and axle unit 31 is rolled on the rails 23 to a dip therein (not shown) which aligns the unit with the centering shafts 60 and the air operated center lift 22. Movement of the valve handle 105 (Fig. 5) allows air pressure from the compressor 106 and the supply line 107 to pass through an air control valve 108 to the center lift pressure line 109 so as to actuate the lift block 104 and lift the wheel and axle unit from a wheel-supported position to a horizontal axle-supported position where the axle center line is aligned with the axis of the centering shafts 60. By this means, perfect centering and alignment of the axle journal 110 and the bearing sleeve 32 may be obtained. The handle 111 for the air control valve 112 is then actuated, allowing air pressure from the supply line 107 through the valve 112 and the pressure line 113 to actuate the air operated piston and cylinder unit 95 on the left half 20 of the press. The unit 95 forces the straight left wedge 86 down between the left rear wedge guide 49 and the front wedge guide 63. This action forces forward or toward the axle the entire longitudinally movable shaft assembly, which slides on the slide track 51, a predetermined distance 114 (Fig. 1) whereby the centering cone 82 is inserted in a complementary conical recess in the end of the axle 80. Then the handle 115 for the air control valve 116 is actuated, allowing air pressure from the supply line 107 through the valve 116 and the pressure line 117 to operate the air operated piston and cylinder unit 87 mounted on the right half 21 of the press. The unit 87 forces the angular right wedge 85 down in the guide slots 64 and 65 of the right front wedge guide 63 and the rear wedge guide 48 respectively. This action forces forward or toward the axle the entire longitudinally movable shaft assembly, which slides on the slide track 51, a predetermined distance 118 (Fig. 7) whereby the centering cone 82 is inserted in a complementary conical recess 119 in the right end of axle 80 (Fig. 1). As the left wedge 86 is now stationary, the entire left half 20 of the press acts as a solid stop so as to allow the action of the right cylinder unit 87 to firmly and positively clamp the axle between the centering shafts 60. The reason for the right wedge 85 being angular is to allow for any longitudinal dimensional variations among the plurality of axles brought before the press. Thus, by providing for wheel diameter tolerances by lifting the wheel and axle unit and for axle longitudinal tolerances by an angular wedge, perfect centering and engagement of the axle and the bearing sleeve is obtained.

Figure 6:
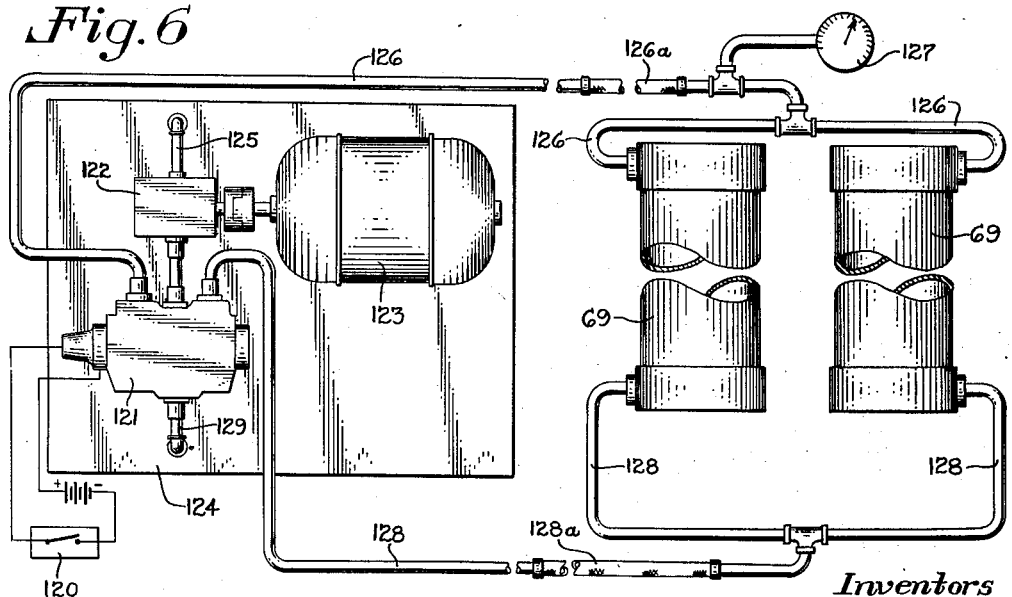
Fig. 6 is a diagrammatic view of the fluid control system for operation of one set of the press mandrels.
Figure 9:
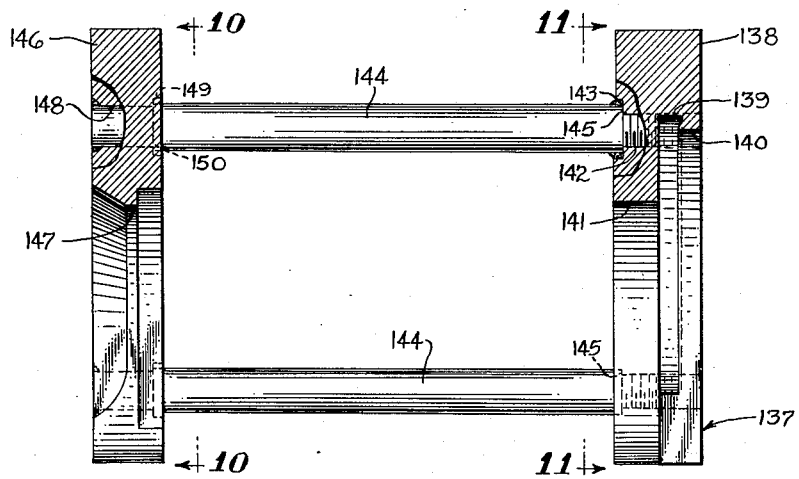
Fig. 9 is a vertical sectional view of the bearing puller taken along the line 9—9 of Fig. 8.
Figure 8:
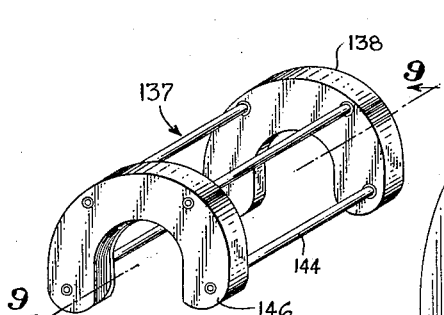
Fig. 8 is a perspective view of a bearing puller for use with the press embodied herein.
Figure 10:
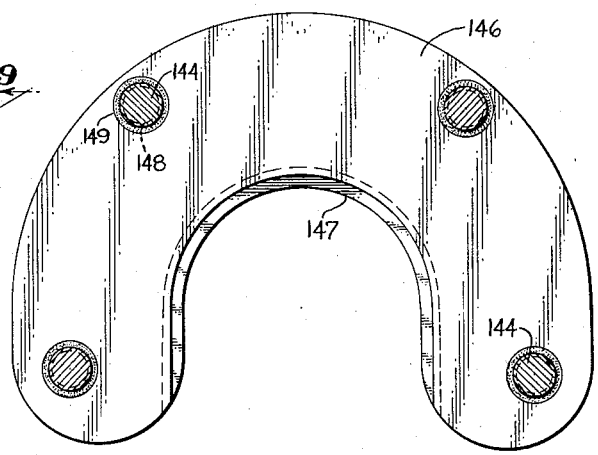
Fig. 10 is a vertical sectional view of the wheel and axle unit end of the bearing puller, showing the inside in elevation.
Figure 11:
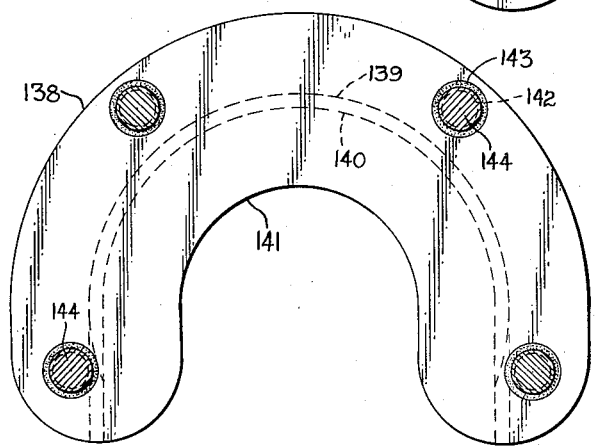
Fig. 11 is a vertical sectional view of the press end of the bearing puller, showing the inside of the end in elevation.

At this operational point, the center lift may be either held or released, as the press is now actually holding the unit suspended in air in an axle supported position, the upward force of the center lift being unnecessary because of the horizontal forces of the press halves. For specific disclosure, it will be assumed that the lift is left in the raised position. The next sequential step is performed by closing the electric switch 120 (Fig. 6), thereby operating the solenoid-actuated hydraulic valve 121 to allow oil or other fluid under pressure from a pump 122, which is driven by a motor 123 and which draws the fluid from a reservoir 124 through a supply line 125, to pass through the valve 121 and a pressure line 126 to actuate both fluid operated piston and cylinder units 69 mounted on the right half 21 of the press. The simultaneous actuation of both units 69 forces the unit piston rods 72 forward or toward the axle unit 31, the rods pushing forward the cylinder head 74, the clamping ring 77, and the bearing pusher 33, thus pressing the bearing 34 from the bearing sleeve onto the axle journal 110 (Fig. 7). A pressure gauge 127 is provided in the pressure line 126 whereupon the pressure reaching a certain reading, the electric switch 120 is opened (by known means not shown herein), thus operating the valve 121 to shut off line 126 and release the pressure. The reason for the different sized cylinder units 87 and 95 becomes apparent here. The left wedge 86 being straight, it cannot be moved vertically by action of the hydraulic units 69, but as the right wedge 85 is angular, there is a possibility that the right cylinder unit 87 might be overcome by the continued positive action of the hydraulic units 69, after they have pressed the bearing home, tending to force the angular wedge 85 upward. An air cylinder 87 capable of withstanding such positive action is therefore provided. A control circuit identical to that shown in Fig. 6 is provided for the left half 20 of the press, whereby simultaneous or individual actuation of both bearing pushers 33 is possible.

Upon opening the switch 120, the pressure through the valve 121 is re-directed through the return lines 128 to the return ends of the units 69, forcing the initial fluid out the pressure lines 126 through the valve and through the exhaust line 129 to the reservoir 124, this action returning the cylinder head 74 and associated parts to their non-operating position. This step is repeated or performed simultaneously for the left half 20 of the press. The handle 115 for the right unit valve 116 is returned, thus allowing air pressure from the supply line 107 to be directed through a return line 130 to the return end of the unit 87, thereby forcing the initial air under pressure out the pressure line 117 through the valve and out the common exhaust line 131, this action forcing the right wedge 85 to its upper non-actuating position. At this point, the right return piston and cylinder unit 40, which has been under constant pressure during the entire operation by means of a shut-off valve 132 and supply lines 133 being open to the air supply line 107 and which unit was pressed from a normal extended position (Fig. 4) to an abnormal position (Fig. 7) by the return plate 66 during the wedge actuation operation, the excess pressure having been forced back into the main supply line 107, forces the piston rod stud 67 against the return plate 66, thus forcing the center support 59 and thereby the entire shaft assembly back to the non-operating position.

After the right half 21 of the press is fully returned to the non-operating position, the handle 111 for the air control valve 112 is returned to the original position, thus redirecting pressure from the supply line 107 through the valve 112 and the return line 135 to the return end of the unit 95, thereby forcing the initial air under pressure out the pressure line 113, through the valve 112 and out the common exhaust line 131. This action returns the left wedge 86 to the non-actuating position and then the left return piston and cylinder unit 40a returns the left half shaft assembly back to the non-operating position. The sequential operation is completed by returning the center lift valve handle 105 to the original position, whereby pressure is directed through the return line 136 to the unit 22 causing the compressed air at the lower end of the cylinder to flow out the pressure line 109 through the valve 108 and out the exhaust line 131. Thus the lift block 104 is lowered, lowering the wheel and axle unit 31, complete with bearings 34, to the rails 23, thereby completing the entire sequential bearing pressing operation without moving the wheel and axle unit, except for a slight lift for alignment purposes. As the various cylinder units, except the center lift, are movable relative to their valve controls, the pressure and return lines must have a flexible portion, indicated by adding the suffix "a" to the line reference number.

For the removal of a bearing 34 from the axle journal 110, a bearing puller 137 (Figs. 8–11) specially adapted for use with either half of the press is provided. The puller 137 comprises a U-shaped hooking end 138 which has an internal groove 139, the rear side of which is defined by a radially inwardly directed flange 140, and a U-shaped opening 141. Threaded holes 142 with counterbores 143 are tapped in the inner face of end 138 and the reduced threaded end of a tie rod 144 is screwed into each until the shoulder 145 formed by the reduced end contacts the faces of counterbore 143, whereupon the tie rods 144 are secured to the end 138, as by welding to the inner face. A U-shaped puller end 146 completes the bearing puller 137, the puller end having an internal shoulder 147 and holes 148 drilled therein, with counterbores 149 at the inner ends and countersinks at the outer ends. The puller end 146 is pressed upon the free tie rod ends until the faces of the counterbores 149 contact a shoulder 150 on each tie rod 144, then the tie rods are secured to the puller end 146, as by welding at the counterbores and countersinks.

When used, the bearing puller 137 is placed over the bearing 34 (Fig. 7) on the axle journal 110 in such a manner that the hooking end groove 139 and flange 140 engage an outer peripheral projection 151 of the clamping ring 77, and the open bore 141 clears the bearing pusher 33. The puller end internal shoulder 147 rests on an inner diameter 152 of the axle 80 and contacts the outer end 153 of the bearing 34. Upon return movement of the cylinder head 74 and associated parts, and the centering shaft 60, the puller 137 actually pulls the bearing from the journal and onto the bearing sleeve 32, whereupon the bearing puller 137 may then be lifted from engagement with the bearing and press parts and removed.

It is of course advantageous to have a press capable of handling any of the four A.A.R. approved axle journal sizes, which vary in journal length and diameter. To adapt the press for such capabilities, the various sized lengths are determinative of the thickness of the wedge shims 47, which may be removed and replaced merely by removing the backstop bolts 45a (Fig. 4). As the diameter of the bearing sleeve 32 is determined by the diameter of the axle journal 110, various sized sleeves may be provided, with corresponding changes in the inner diameters of the bearing pusher 33 and the cylinder head 74. By providing these necessary parts to correspond with the various sized axle journals and making their interchange relatively simple, no time loss or complicated teardown and rebuild is necessary to adapt the press to any of the axle journals.

Thus it may be seen that a bearing press is provided whereby bearing may be simultaneously pressed on both bare journal ends of any regulation sized axle by a sequential operation, capable of being automatic, wherein a wheel and axle unit is suspended in the air by vertical wedge action thereby allowing perfect centering and alignment of the press bearing sleeve and the axle journal, the entire pressing and pulling action occurring without appreciably moving the unit.

What is claimed is:

1. In a machine for pressing bearings on the axle journals of a railway wheel and axle unit, the combination of a track along which the unit may be rolled into and out of the machine, opposed centering shaft assemblies spaced apart transversely of the track and each including an axle centering member engaging the axle to support the unit clear of the track and a bearing-carrying sleeve, a vertically movable lift between said assemblies for moving the unit from a wheel-supported position to a raised position where the axle is in axially aligned relation with said centering members, fluid actuated means operable to move the centering members into engagement with the aligned axle, a fluid actuated bearing pusher member movable parallel to the bearing-carrying sleeve for transferring a bearing from each sleeve to a jounal on each of said axle, and fluid actuated piston and cylinder means operatively engaging said centering shaft assemblies to return the assemblies to their original positions for removal of said unit from the machine.

2. A machine for pressing bearings on the axle journals of a railway wheel and axle unit comprising the combination of a foundation and two substantially similar press halves spaced from and facing each other on said foundation, each press half comprising a stationary support, a centering shaft assembly longitudinally slidable on said support and including an axle centering member and a bearing-carrying sleeve, a vertically movable lift between said press halves operative in the vertical plane of said centering shaft assembly to carry the unit axle into axial alignment with said assembly, fluid operated means operable between a portion of said support and said centering shaft assembly to force said centering member into supporting engagement with the axle in axially aligned relation therewith, a fluid actuated bearing pusher member operatively surrounding said sleeve and reciprocable relative thereto for transfering a bearing from the sleeve to said axle journal, and a fluid actuated piston and cylinder unit operatively engaging said centering shaft assembly for forcing the assembly out of engagement with the axle.

References Cited in the file of this patent

UNITED STATES PATENTS

| | | |
|---|---|---|
| 799,229 | Fildes | Sept. 12, 1905 |
| 1,026,548 | Allen | May 14, 1912 |
| 1,094,391 | Longaker | Apr. 21, 1914 |
| 1,099,120 | Derbyshire et al. | June 2, 1914 |
| 1,196,963 | Mahr | Sept. 5, 1916 |
| 1,677,860 | Ferris | July 17, 1928 |
| 2,177,231 | Tinnerman | Oct. 24, 1939 |
| 2,252,036 | Rummer | Aug. 12, 1941 |
| 2,649,178 | Payne | Aug. 18, 1953 |